US011254266B2

(12) United States Patent
Meza Meza

(10) Patent No.: US 11,254,266 B2
(45) Date of Patent: Feb. 22, 2022

(54) LADDER TRANSPORT SYSTEM

(71) Applicant: Elias Meza Meza, Las Vegas, NV (US)

(72) Inventor: Elias Meza Meza, Las Vegas, NV (US)

(*) Notice: Subject to any disclaimer, the term of this patent is extended or adjusted under 35 U.S.C. 154(b) by 0 days.

(21) Appl. No.: 16/849,360

(22) Filed: Apr. 15, 2020

(65) Prior Publication Data

US 2020/0331404 A1 Oct. 22, 2020

Related U.S. Application Data

(60) Provisional application No. 62/835,037, filed on Apr. 17, 2019.

(51) Int. Cl.
*B60R 9/048* (2006.01)
*B60R 11/00* (2006.01)

(52) U.S. Cl.
CPC ....... *B60R 9/0485* (2013.01); *B60R 2011/004* (2013.01); *B60R 2011/0059* (2013.01); *B60R 2011/0071* (2013.01)

(58) Field of Classification Search
CPC ......... B60R 9/04; B60R 9/0423; B60R 9/048; B60R 9/0485; B60R 11/00
USPC ........................................ 296/3, 37.6, 183.1
See application file for complete search history.

(56) References Cited

U.S. PATENT DOCUMENTS

| | | | |
|---|---|---|---|
| 4,957,400 A * | 9/1990 | Karp | B60R 9/00 224/309 |
| 5,513,890 A | 5/1996 | Christensen | |
| 6,193,452 B1 | 2/2001 | Skiba | |
| 6,315,327 B1 * | 11/2001 | Woolsey | B60R 11/00 280/770 |
| 6,454,149 B1 * | 9/2002 | Moore | B60P 3/40 224/309 |
| 6,971,563 B2 | 12/2005 | Levi | |
| 7,513,726 B1 * | 4/2009 | Comiskey, Jr. | B60P 3/40 296/3 |
| 7,758,091 B1 | 7/2010 | McCall | |
| 7,913,885 B2 | 3/2011 | Long | |
| D635,909 S * | 4/2011 | Moore | D12/406 |
| 9,346,410 B2 * | 5/2016 | Godin | B62D 35/001 |
| 2003/0129038 A1 * | 7/2003 | Addy | B60P 7/0823 410/97 |
| 2011/0214944 A1 | 9/2011 | Levi | |
| 2012/0181314 A1 * | 7/2012 | Moore | B60R 9/0485 224/402 |
| 2012/0241485 A1 * | 9/2012 | Moore | B60R 9/0485 224/282 |

* cited by examiner

*Primary Examiner* — Jason S Daniels

(74) *Attorney, Agent, or Firm* — Boudwin Intellectual Property; Daniel Boudwin

(57) ABSTRACT

A ladder transport system includes a cabin support member having an upper panel affixed to a rear panel, wherein the cabin support member can removably secure to a cabin of a vehicle. An aperture is disposed through the rear panel. A tailgate support member includes a front wall, a rear wall, and an upper wall extending therebetween defining an interior channel. The interior channel receives a tailgate of the vehicle therein, such that the tailgate support member is removably secured to the tailgate. A pair of support rods extend from the upper wall to engage a rung of a ladder.

17 Claims, 4 Drawing Sheets

LADDER TRANSPORT SYSTEM

CROSS REFERENCE TO RELATED APPLICATIONS

This application claims the benefit of U.S. Provisional Application No. 62/835,037 filed on Apr. 17, 2019. The above identified patent application is herein incorporated by reference in its entirety to provide continuity of disclosure.

BACKGROUND OF THE INVENTION

The present invention relates to ladder transportation systems. More particularly, the present invention pertains to a ladder transport system configured to secure to a pickup truck or other similar vehicle, such that the ladder is secured to the vehicle thereby.

Many individuals use ladders for working on various construction projects or professions. Transporting ladders, however, typically requires a large vehicle, such as a pickup truck. Typical ladder transportation systems available for use with such vehicles fail to provide adequate protection to the vehicle, often resulting in damage to the vehicle bed or paint finish. While not ideal in a professional context, such damage is significantly more problematic in a personal context, such as when an individual uses their own personal vehicle for transporting ladders. Scuffs, scrapes, and other damage that occurs during transport of a ladder with a typical transport system can result in significant expense in repairing the damaged vehicle. Therefore, a ladder transportation system that can securely store a ladder on a vehicle while protecting the bed and paint of a vehicle is desired.

In light of the devices disclosed in the known art, it is submitted that the present invention substantially diverges in design elements from the known art and consequently it is clear that there is a need in the art for an improvement to existing ladder transport systems. In this regard, the instant invention substantially fulfills these needs.

SUMMARY OF THE INVENTION

In view of the foregoing disadvantages inherent in the known types of ladder transport systems now present in the known art, the present invention provides a ladder transport system wherein the same can be utilized for providing convenience for the user when preventing damage to a vehicle bed or paint finish.

The present system comprises a cabin support member having an upper panel affixed to a rear panel, wherein the cabin support member is configured to removably secure to a cabin of a vehicle. An aperture disposed through the rear panel. A tailgate support member having a front wall, a rear wall, and an upper wall extending therebetween defining an interior channel, wherein the interior channel is configured to receive a tailgate of the vehicle therein, such that the tailgate support member is removably secured to the tailgate. A pair of support rods extend from the upper wall, wherein the pair of support rods are configured to engage a rung of a ladder. In some embodiments, the pair of support rods comprise an arcuate rod configured to contour to the shape of a ladder rung. In another embodiment, a semi-cylindrical cutout extends along a length of the cabin support member between the upper panel and the rear panel, such that the cabin support member can better conform to a rounded rear corner of a variety of vehicle cabins.

In another embodiment, a plurality of ridges is disposed along each of the upper panel and the upper wall, such that the plurality of ridges is configured to increase frictional engagement of the ladder therewith. In some embodiments, the upper panel comprises a first portion and a second portion, wherein the first portion is orthogonal to the rear panel, and the second portion is angled relative to the first portion. In this manner, the ladder second portion is configured to provide a surface upon which the ladder rests against the cabin of the vehicle. In such embodiments with a plurality of ridges, the plurality of ridges is disposed along the second portion of the upper panel, ensuring that the ladder is frictionally engaged therewith. In another embodiment, the upper wall of the tailgate support member includes an angled upper surface. In some such embodiments, the upper wall and the upper panel are coplanar, such that the ladder extends along a linear path between the cabin support member and the tailgate support member.

In some embodiments, the front wall comprises a greater length that the rear wall, such that the tailgate support member is supported on the tailgate when the tailgate is in both a closed and open position. As such, the front wall is disposed on an interior side of the tailgate, ensuring a larger surface area to support the tailgate support member in an open position. In another embodiment, the rear wall further comprises a protrusion extending into the interior channel to provide additional frictional engagement with the tailgate. In some embodiments, the interior channel is dimensioned to contour to the tailgate to provide better frictional engagement.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
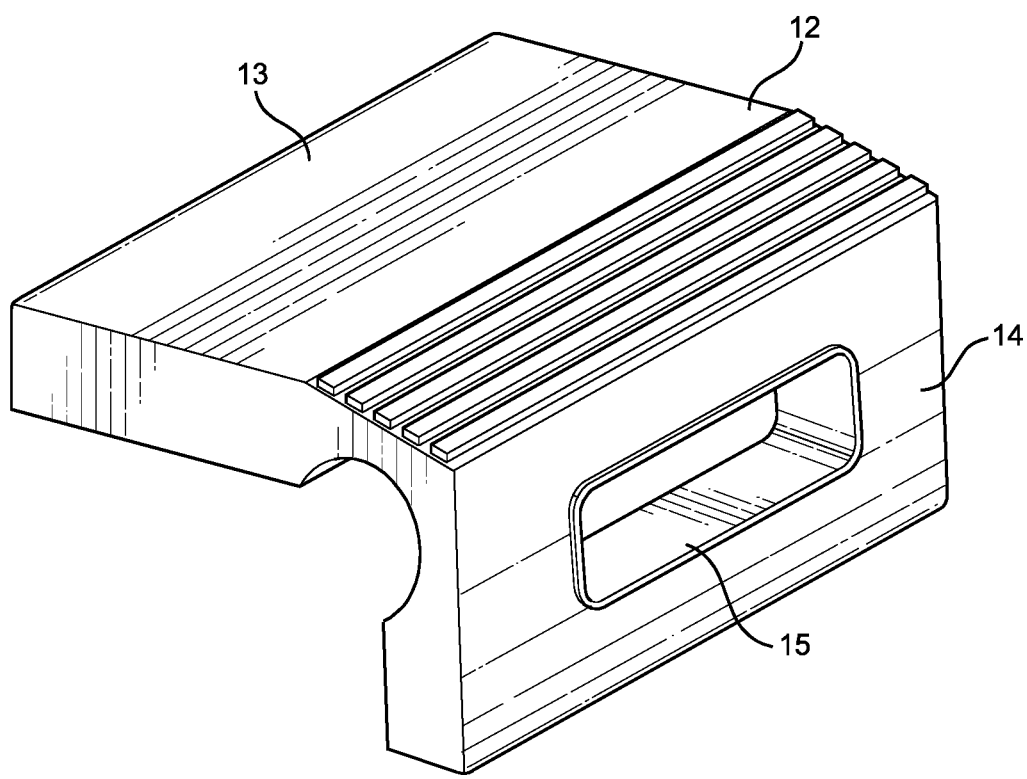
FIG. 1 shows a perspective view of the cabin support member of an embodiment of the ladder transport system.

Reference is made herein to the attached drawings. Like reference numerals are used throughout the drawings to depict like or similar elements of the ladder support system. The figures are intended for representative purposes only and should not be considered to be limiting in any respect.

Referring now to FIG. 1, there is shown a perspective view of the cabin support member of an embodiment of the ladder transport system. The ladder transport system comprises a cabin support member 12 having an upper panel 13 to a rear panel 14. In the illustrated embodiment, the upper panel 13 is disposed substantially orthogonally to the rear panel 14, such that the cabin support member 12 is configured to removably secure to a rear portion of a vehicle cabin. In the shown embodiment, the cabin support member 12 further comprises an aperture 15 disposed through the rear panel 14, wherein the aperture 15 is dimensioned to expose a brake light on a rear side of the vehicle cabin. In this manner, the cabin support member 12 can adhere to various vehicle laws requiring brake light visibility. The cabin support member 12 can comprise a variety of materials, including rubber, silicon, and the like. In such embodiments, the cabin support member 12 comprises a material having a high coefficient of friction, such that the cabin support member 12 is retained on the vehicle cabin and can retain objects thereon via frictional engagement. In other embodiments, an interior surface of the cabin support member 12 comprises an adhesive thereon, wherein the adhesive is configured to removably secure the cabin support member 12 to the vehicle cabin.

Figure 2:
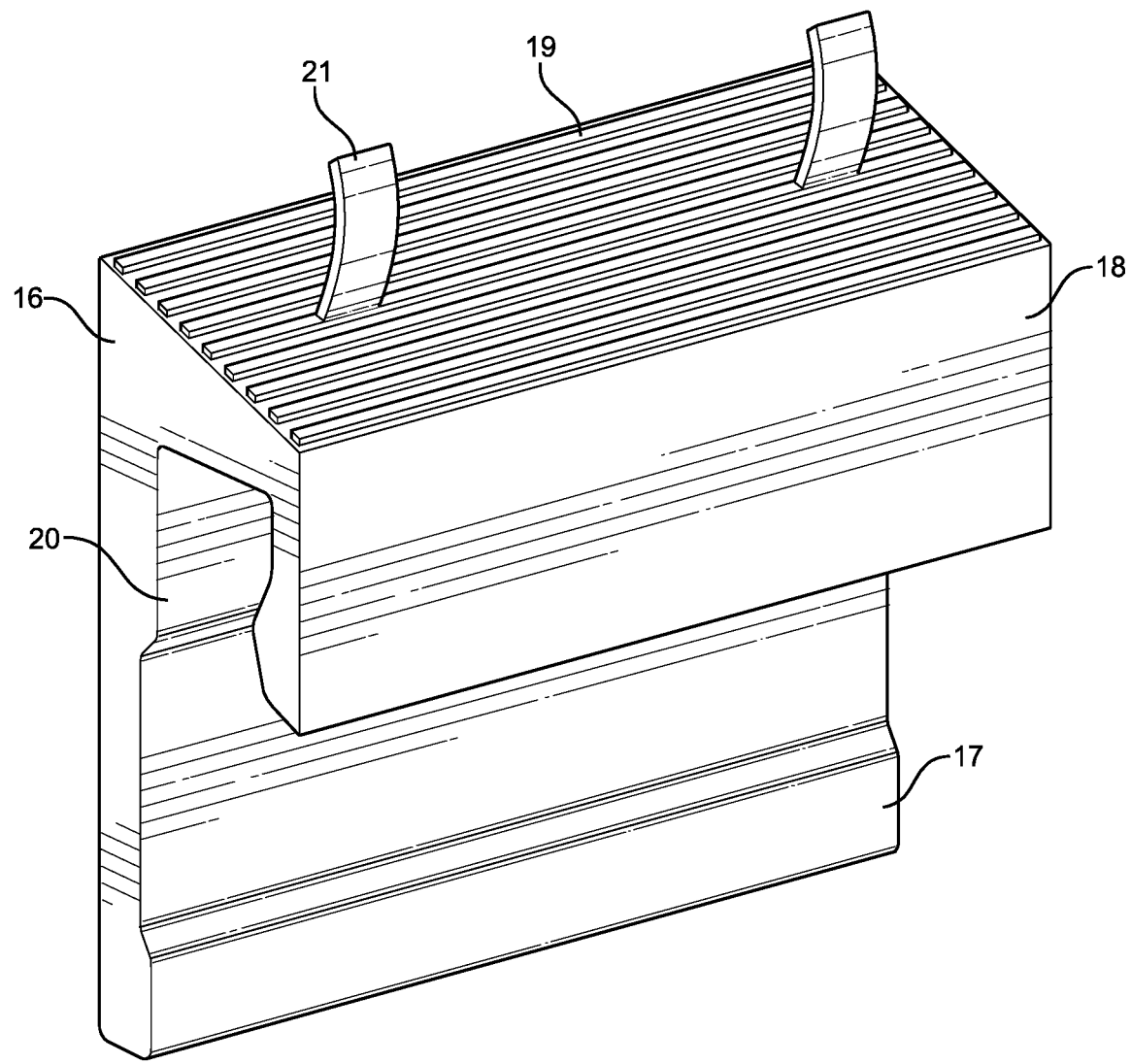
FIG. 2 shows a perspective view of the tailgate support member of an embodiment of the ladder transport system.

Referring now to FIG. 2, there is shown a perspective view of the tailgate support member of an embodiment of the ladder transport system. The ladder transport system further comprises a tailgate support member 16 having a front wall 17, a rear wall 18, and an upper wall 19 extending therebetween defining an interior channel 20 therebetween. The interior channel 20 is dimensioned to receive a tailgate of a vehicle therein, such that the tailgate support member 16 is removably secured thereto. Similar to the cabin support member described above, the tailgate support member 16 can comprise a variety of materials having properties commensurate with durability and frictional engagement, such as rubber and silicon. In some embodiments, the tailgate support member 16 further comprises an adhesive disposed on an interior surface thereof, such that the adhesive is configured to removably secure the tailgate support member 16 to the tailgate of a vehicle. In other embodiments, the tailgate support member 16 comprises a flexible material spring-biased towards the interior channel 20, such that the front and rear walls 17, 18 engage opposing sides of the tailgate to securely adhere the tailgate support member 16 thereto.

A pair of support rods 21 extend from the upper wall 19 of the tailgate support member 16, wherein the pair of support rods 21 are configured to engage a rung of a ladder thereon. In this manner, the ladder can be securely placed upon the tailgate support member 16 along the upper wall 19 thereof, such that movement of the ladder is restricted by the pair of support rods 21. In the illustrated embodiment, the pair of support rods 21 are spaced widely apart, such that lateral movement of a ladder engaged thereby during transport is minimized. In this manner, each support rod of the pair of support rods 21 is disposed on opposing lateral sides of the upper wall 19. In other embodiments, the pair of support rods 21 comprise clamps configured to removably secure a rung of a ladder therein, such as, but not limited to C-shaped clamps. In this way, the ladder is removably secured to the upper wall 19 via the pair of clamps, rather than retained by the pair of support rods 21 as shown.

Figure 3A:
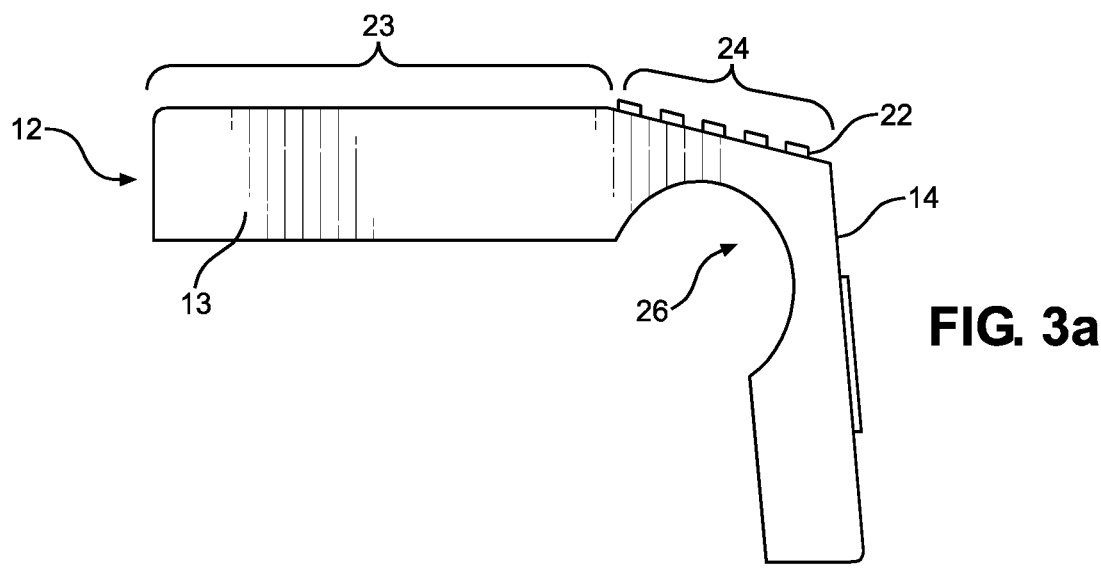
FIG. 3A shows a side view of the cabin support member of an embodiment of the ladder transport system.
Figure 3B:
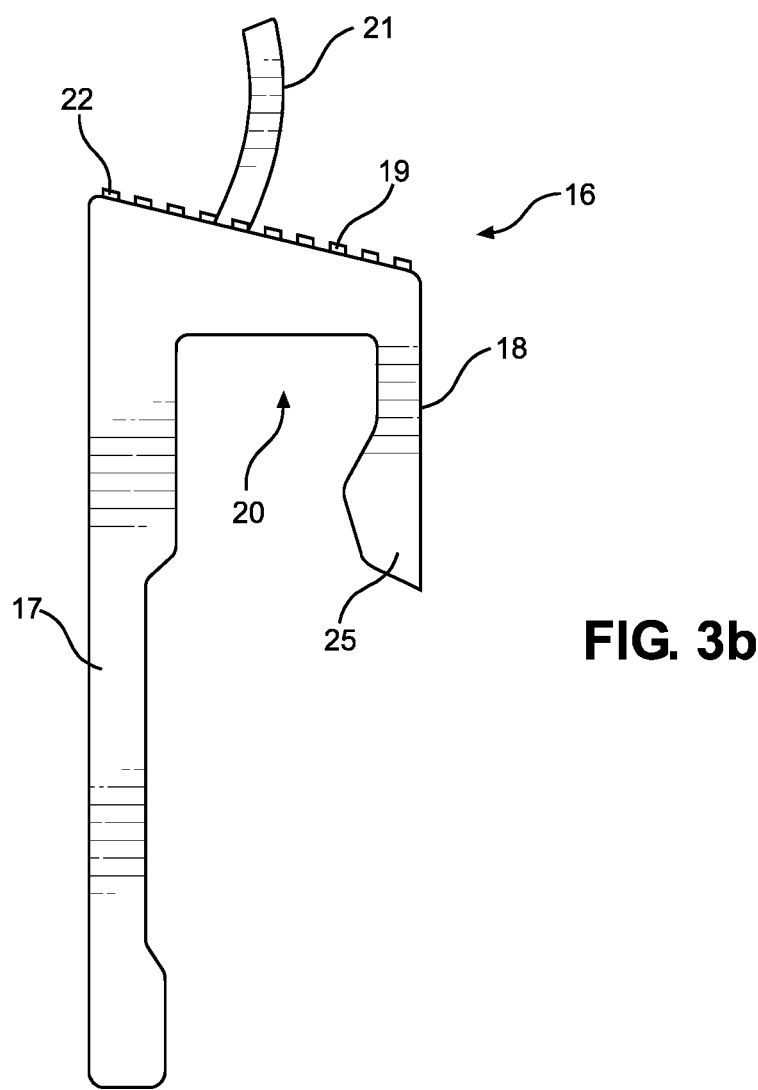
FIG. 3B shows a side view of the tailgate support member of an embodiment of the ladder transport system.

Referring now to FIGS. 3A and 3B, there is shown a side view of the cabin support member of an embodiment of the ladder transport system and a side view of the tailgate support member of an embodiment of the ladder transport system, respectively. In the illustrated embodiment of FIG. 3A, the cabin support member 12 further comprises a semi-cylindrical cutout 26 disposed between the upper panel 13 and the rear panel 14. The semi-cylindrical cutout 26 extends along a length of the cabin support member 12 between the upper and rear panels 13, 14. The semi-cylindrical cutout 26 is configured to allow the cabin support member 12 to flex, such that the cabin support member 12 can adhere to a variety of vehicle cabin shapes. Additionally, the semi-cylindrical nature of the semi-cylindrical cutout 26 allows a seam between the upper and rear panels 13, 14 to accommodate various vehicle cabin edge shapes, as vehicle cabins can typically range between angled and rounded edges. In alternate embodiments, the cabin support member 12 is dimensioned to conform to a specific vehicle cabin, allowing the user to select an appropriate ladder transport system for the vehicle in question.

In the shown embodiment, the tailgate support member 16 includes the interior channel 20 configured to conform to a vehicle tailgate. In some embodiments, the interior channel 20 is dimensioned to allow the tailgate support member 16 to affix to a variety of vehicle tailgates, whereas in alternate embodiments, the tailgate support member 16 is configured to conform to a specific vehicle tailgate. In the illustrated embodiment, a protrusion 25 extends from an interior surface of the rear wall 18, wherein the protrusion 25 is configured to frictionally engage a tailgate of the vehicle, thereby securing the tailgate support member 16 to the tailgate of the vehicle. In this manner, the tailgate support member 16 is retained on the tailgate of the vehicle when the tailgate is in both an open position and a closed position. In alternate embodiments, the protrusion 25 can extend from the front wall 17, or both the front and rear walls 17, 18 in order to better conform to a specific tailgate shape. In the shown embodiment, the pair of support rods 21 further comprise an arcuate shape configured to conform to the shape of a ladder rung. In this way, the pair of support rods 21 engage the ladder rung over a larger surface area, further securing the ladder to the tailgate support member 16.

In the illustrated embodiment, the upper panel 13 comprises a first portion 23 and a second portion 24, wherein the first and second portions 23, 24 are disposed at different angles, such that the first and second portions 23, 24 are not coplanar. In this way, the first portion 23 can secure to the substantially planar upper surface of the vehicle cabin, whereas the second portion 24 can be angled to engage a ladder extending between the cabin support member 12 and the tailgate support member 16. Similarly, the upper wall 19 of the tailgate support member 16 is disposed at an angle relative to the front and rear walls 17, 18. In such embodiments, the second portion 24 and the upper wall 19 are disposed at the same angle such that the second portion 24 and the upper wall 19 are coplanar. In this manner, a ladder resting on the ladder transport system is aligned such that the ladder extends between the tailgate and the cabin at the angle of the upper wall 19 and the second portion 24, engaging across an entirety of the upper wall 19 and the second portion 24. In the shown embodiment, a plurality of ridges 22 are disposed along each of the upper wall 19 and the second portion 24, wherein the plurality of ridges 22 are configured to increase the surface area of material in contact with the ladder, thereby ensuring greater frictional engagement therewith.

Figure 4:
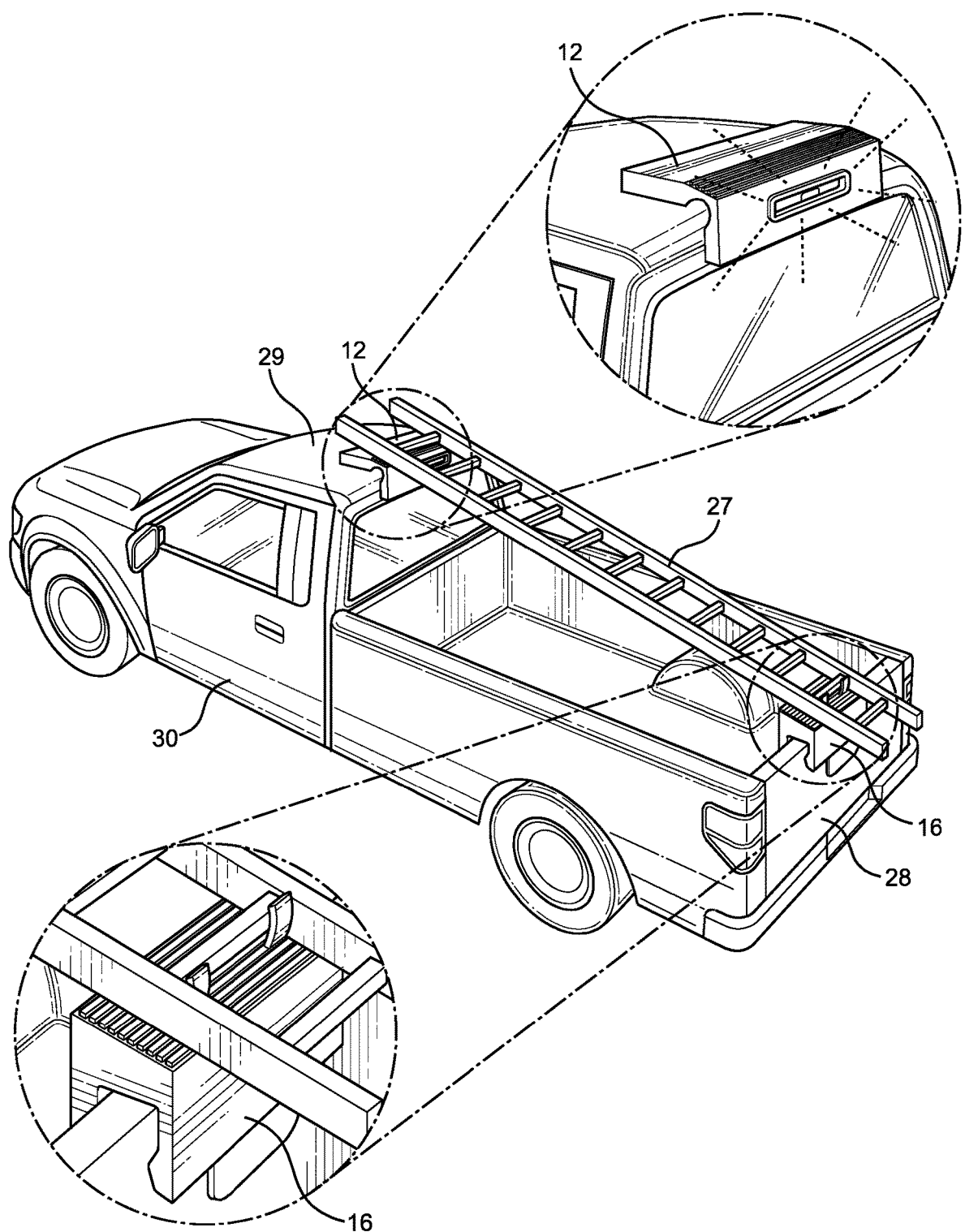
FIG. 4 shows a perspective view of an embodiment of the ladder transport system in use.

Referring now to FIG. 4, there is shown a perspective view of an embodiment of the ladder transport system in use. In one use, the cabin support member 12 is secured to the cabin 29 of the vehicle 30 along a rear side thereof. In the shown embodiment, the cabin support member 12 further comprises an aperture therethrough, allowing a rear cabin brake light to shine therethrough. In this manner, the cabin support member 12 doesn't impede visibility of the rear cabin brake light. The tailgate support member 16 is then secured to the tailgate 28 of the vehicle 30. A user can then removably secure a ladder 27 to the vehicle 30 by placing the ladder 27 across the tailgate support member 16 and the cabin support member 12. The pair of support rods of the tailgate support member 16 secure a rung of the ladder 27 thereon, such that forward movement of the vehicle 30 does not cause the ladder 27 to slide off of the vehicle 30. In alternate embodiments, the rung of the ladder 27 is secured to the tailgate support member 16 via a pair of clamps disposed on the upper wall thereof. As shown, the ladder 27 is disposed at an angle corresponding to the relative heights of each of the cabin 29 and the tailgate 28, wherein the angle defined therebetween is equivalent to the second portion of the cabin support member 12 and the upper wall of the tailgate support member 16. In this manner, the ladder 27 is supported over a bed of the vehicle 30, by the cabin support member 12 and the tailgate support member 16, such that the ladder 27 does not cause damage to the bed, tailgate 28, or cabin 29 of the vehicle 30.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ladder transport system, comprising:
   a cabin support member having an upper panel affixed to a rear panel;
   wherein the cabin support member is configured to removably secure to a cabin of a vehicle;
   an aperture disposed through the rear panel;
   a tailgate support member having a front wall, a rear wall, and an upper wall extending therebetween defining an interior channel;
   wherein the interior channel is configured to receive a tailgate of the vehicle therein, such that the tailgate support member is removably secured to the tailgate;
   wherein the rear wall further comprises a protrusion extending therefrom into the interior channel;
   a pair of support rods extending from the upper wall.

2. The ladder transport system of claim 1, further comprising a plurality of ridges disposed along each of the upper panel and the upper wall.

3. The ladder transport system of claim 1, wherein the upper panel comprises a first portion and a second portion, wherein the first portion is orthogonal to the rear panel, and the second portion is angled relative to the first portion.

4. The ladder transport system of claim 3, wherein the second portion is coplanar with the upper wall when the cabin support member and the tailgate support member are affixed to the vehicle.

5. The ladder transport system of claim 1, wherein the upper wall comprises an angled upper surface.

6. The ladder transport system of claim 1, wherein the pair of support rods are arcuate.

7. The ladder transport system of claim 1, wherein the front wall comprises a greater length than the rear wall.

8. The ladder transport system of claim 1, wherein the interior channel is dimensioned to contour to the tailgate.

9. A ladder transport system, comprising:
   a cabin support member having an upper panel affixed to a rear panel;
   wherein a semi-cylindrical cutout extending along the cabin support member between the upper panel and the rear panel;
   wherein the cabin support member is configured to removably secure to a cabin of a vehicle;
   an aperture disposed through the rear panel;
   a tailgate support member having a front wall, a rear wall, and an upper wall extending therebetween defining an interior channel;
   wherein the interior channel is configured to receive a tailgate of the vehicle therein, such that the tailgate support member is removably secured to the tailgate;
   wherein the rear wall further comprises a protrusion extending therefrom into the interior channel;
   a pair of support rods extending from the upper wall.

10. The ladder transport system of claim 9, further comprising a plurality of ridges disposed along each of the upper panel and the upper wall.

11. The ladder transport system of claim 9, wherein the upper panel comprises a first portion and a second portion, wherein the first portion is orthogonal to the rear panel, and the second portion is angled relative to the first portion.

12. The ladder transport system of claim 11, wherein the second portion is coplanar with the upper wall when the cabin support member and the tailgate support member are affixed to the vehicle.

13. The ladder transport system of claim 9, wherein the upper wall comprises an angled upper surface.

14. The ladder transport system of claim 9, wherein the pair of support rods are arcuate.

15. The ladder transport system of claim 9, wherein the front wall comprises a greater length than the rear wall.

16. The ladder transport system of claim 9, wherein the interior channel is dimensioned to contour to the tailgate.

17. A ladder transport system, comprising:
   a cabin support member having an upper panel affixed to a rear panel;
   wherein the cabin support member is configured to removably secure to a cabin of a vehicle;
   wherein the upper panel comprises a first portion and a second portion, wherein the first portion is orthogonal to the rear panel, and the second portion is angled relative to the first portion;
   an aperture disposed through the rear panel;
   a tailgate support member having a front wall, a rear wall, and an upper wall extending therebetween defining an interior channel;
   wherein the interior channel is configured to receive a tailgate of the vehicle therein, such that the tailgate support member is removably secured to the tailgate;
   wherein the second portion is coplanar with the upper wall when the cabin support member and the tailgate support member are affixed to the vehicle;
   a pair of support rods extending from the upper wall.

* * * * *